United States Patent Office
3,210,366
Patented Oct. 5, 1965

3,210,366
MANUFACTURE OF 2,2'-DIPYRIDYL
George Henry Lang and Randal George Arthur New, Manchester, England, assignors to Imperial Chemical Industries Limited, London, England, a corporation of Great Britain
No Drawing. Filed Feb. 21, 1963, Ser. No. 260,303
Claims priority, application Great Britain, Mar. 8, 1962, 9,031/62
9 Claims. (Cl. 260—296)

This invention relates to an improved process for the manufacture of 2:2'-dipyridyls from pyridine or alkylpyridine.

2:2'-dipyridyl and certain of its alkyl derivatives are valuable intermediates for the preparation of herbicides and may be prepared by the action of Raney nickel catalyst on pyridine or the appropriate alkylpyridine. The use of this catalyst however introduces a fire hazard, and furthermore the catalyst rapidly loses activity during the reaction and is not capable of regeneration.

We have now found that platinum and ruthenium also act as catalysts for the conversion of pyridines into dipyridyls and in comparison with Raney nickel exhibit greater resistance to poisoning and are less hazardous in use.

According to our invention therefore we provide an improved process for the manufacture of 2:2'-dipyridyl or alkyl derivatives thereof from pyridine or an alkylpyridine by heating at a temperature above 100° C. with platinum or ruthenium as catalyst in finely divided form.

As alkylpyridines which may be used in the process of our invention there may be mentioned for example any pyridine carrying a lower alkyl group, by which is meant an alkyl group containing not more than six carbon atoms. Two alkyl groups may be present but the groups must not be in both the 2 and 6 positions of the pyridine ring and should not contain altogether more than six carbon atoms. As examples of such alkylpyridines there may be mentioned 3-methyl and 4-methyl-pyridines which afford respectively 5:5'-dimethyl- and 4:4'-dimethyl-2:2'-dipyridyls.

The platinum used as catalyst may be prepared by conventional methods for example those described in "Catalysis," volume I, edited by P. H. Emmett, published by Reinhold Publishing Corporation, 1954, pages 338 to 340. The ruthenium used as catalyst may be prepared by conventional methods for example those described in "Platinum Metals Review," published by Johnson, Matthey and Co. Ltd., volume 6, 1962, No. 1, page 13. It is preferred that these catalysts be supported on a substrate for example on animal charcoal, such supported catalysts being prepared by known methods such as those described in the books mentioned hereinbefore. Ruthenium catalyst is preferred as giving greater output and having longer life. The amount of catalyst would be from 1 to 50% of the weight of pyridine.

The preferred temperatures for carrying out the process of our invention are between 200 and 500° C. Temperatures below this range, for example between 100 and 200° C., can be used but give lower speeds of conversion and higher temperatures lead to side reactions.

The process may be carried out by stirring a mixture of the pyridine and the catalyst at the desired temperature. If a temperature above the boiling point of the pyridine is used an enclosed vessel capable of withstanding the pressure produced may be employed.

The optimum time of reaction varies with the temperature used and the pyridine. For example using pyridine itself at 400° C., no further reaction takes place after about 20 hours. After reaction the catalyst is removed, for example, by filtration, and the dipyridyl isolated by, for example, distillation.

If desired however the process can be carried out in a continuous manner, for example by circulation continuously over the catalyst of unreacted pyridine recovered from the reaction mixture by distillation of dipyridyls accumulating in a vessel separate from that containing the catalyst. By adjustment of the pressure, the catalyst can be operated under vapour phase or liquid phase conditions.

The invention is illustrated but not limited by the following examples in which all parts and percentages are by weight unless otherwise specified:

*Example 1*

6 parts of catalyst, consisting of 5% of platinum on animal charcoal, and 25 parts of pyridine are heated in a sealed glass pressure tube at 300° C. for 10 hours. After cooling the catalyst is removed by filtration to give a solution in pyridine of 1.13 parts of 2:2'-dipyridyl, corresponding to a rate of production of dipyridyl of 37.7 parts per hour per 100 parts of platinum.

*Example 2*

The procedure of Example 1 is repeated using 6 parts of 1% platinum on alumina catalyst instead of 5% platinum on charcoal catalyst. 0.9 part of 2:2'-dipyridyl are obtained, equivalent to a rate of production of dipyridyl of 150 parts per hour per 100 parts of platinum.

*Example 3*

3 parts of catalyst, consisting of 1% platinum on alumina, and 150 parts of pyridine are heated in a stainless steel autoclave for a reaction period of 10 hours at 475° C. 1.4 parts of 2:2'-dipyridyl are obtained, equivalent to a rate of production of dipyridyl of 468 parts per hour per 100 parts platinum.

*Example 4*

1 part of catalyst, consisting of 5 ruthenium on carbon powder and 25 parts of pyridine are heated in a sealed glass pressure tube at 300° C. for 10 hours. After cooling the catalyst is removed by filtration to give a solution in pyridine of 0.97 part of 2:2'-dipyridyl corresponding to a rate of production of dipyridyl of 194 parts per hour per 100 parts ruthenium.

*Example 5*

0.5 part of 5% ruthenium on carbon catalyst and 25 part of pyridine are heated in a sealed glass pressure tube for 50 hours at 250° C. After removal of catalyst by filtration and of pyridine by distillation, 3.15 parts of 2:2'-dipyridyl are obtained, equivalent to a rate of production of dipyridyl of 252 parts per 100 parts of ruthenium.

What we claim is:

1. A process for the manufacture of a compound selected from the group consisting of 2,2'-dipyridyl and alkyl derivatives thereof from a member selected from the group consisting of pyridine and alkylpyridines by heating said member at a temperature above 100° C. with a catalyst selected from the group consisting of platinum and ruthenium in finely divided form.

2. A process as claimed in claim 1 wherein the alkyl group in the alkyl pyridine contains not more than six carbon atoms.

3. A process as claimed in claim 2 wherein the alkyl group is a methyl group in the 3 position of the pyridine ring.

4. A process as claimed in claim 1 wherein the temperature is between 200 and 500° C.

5. A process as claimed in claim 1 wherein the catalyst contains ruthenium.

6. A process as claimed in claim 1 wherein said catalysts is supported on a substrate.

7. A process as claimed in claim 1 wherein the amount of catalyst is from 1 to 50% of the weight of pyridine.

8. A process as claimed in claim 1 wherein said member is brought into contact with the catalyst, removed from the catalyst with further amounts of said member separated by distillation from said compound and recycled to the catalyst.

9. A process as claimed in claim 2 wherein the alkyl group is a methyl group in the 4 position of the pyridine ring.

References Cited by the Examiner

UNITED STATES PATENTS 3,053,846  9/62  Varcoe _____ 260—296

FOREIGN PATENTS 869,954  6/61  Great Britain.
869,955  6/61  Great Britain.

WALTER A. MODANCE, *Primary Examiner.*

NICHOLAS S. RIZZO, JOHN D. RANDOLPH,
*Examiners.*